United States Patent [19]

Grup

[11] 4,432,608
[45] Feb. 21, 1984

[54] VIEWING SCREEN WITH ENHANCED CONTRAST

[75] Inventor: Howard W. Grup, Delanson, N.Y.

[73] Assignee: General Electric Company, Schenectady, N.Y.

[21] Appl. No.: 356,670

[22] Filed: Mar. 10, 1982

[51] Int. Cl.³ .............................................. G03B 21/60
[52] U.S. Cl. .................................................. 350/128
[58] Field of Search ........................ 350/127, 128, 129

[56] References Cited

U.S. PATENT DOCUMENTS 3,523,717  8/1970  Glen, Jr. .......................... 350/128 X
4,140,370  2/1979  Snaper et al. ........................ 350/128

FOREIGN PATENT DOCUMENTS 581014  9/1924  France ................................ 350/128

Primary Examiner—Richard A. Wintercorn
Attorney, Agent, or Firm—Geoffrey H. Krauss; Marvin Snyder; James C. Davis, Jr.

[57] ABSTRACT

A viewing screen, as for use in rear projection television and the like, is provided with enhanced contrast by selectively placing dark lines upon the viewer surface. The dark lines can be placed: orthogonal to lenticules in the viewer surface; in the grooves between, and forming, the lenticules; or both.

10 Claims, 1 Drawing Figure

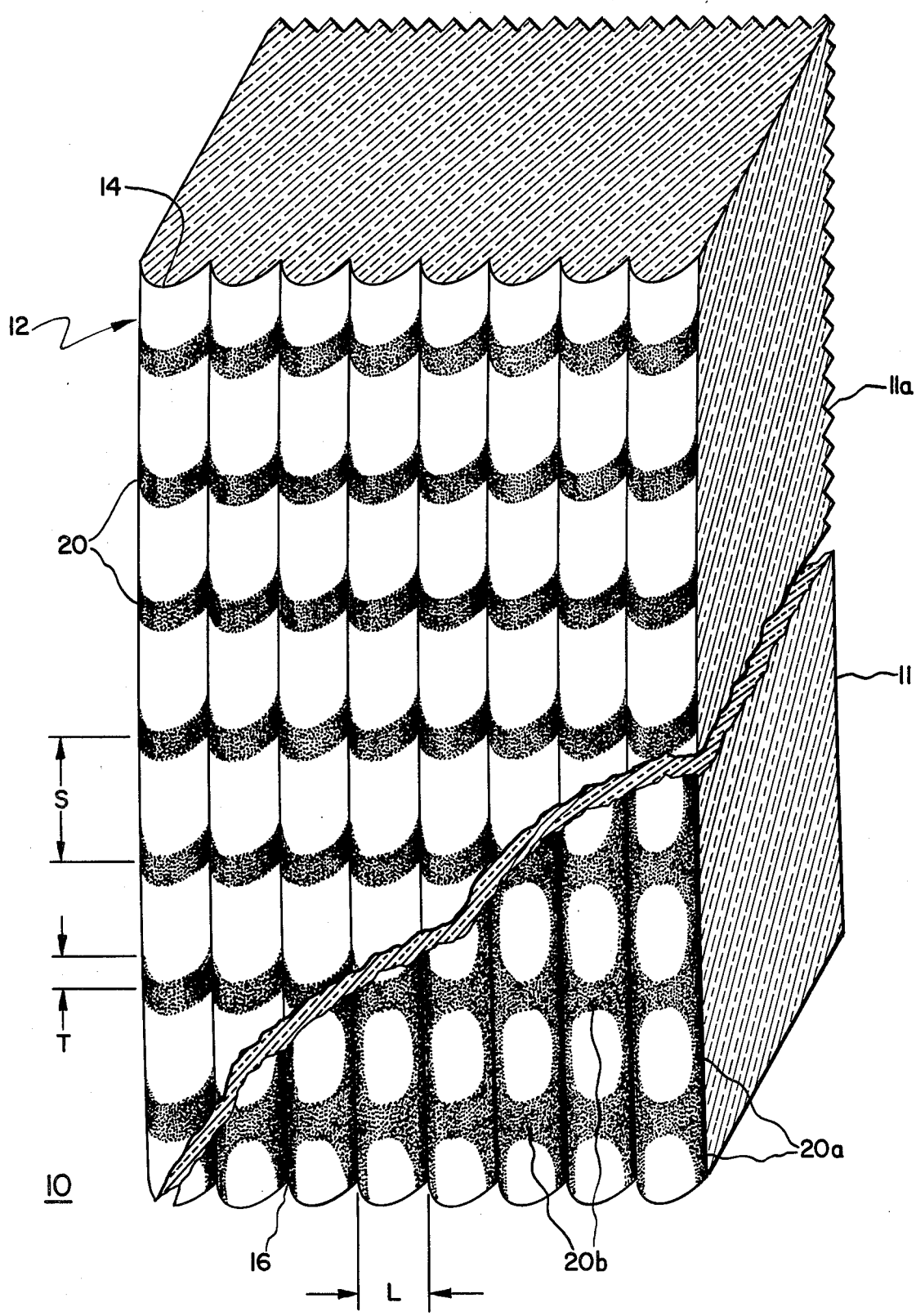

VIEWING SCREEN WITH ENHANCED CONTRAST

BACKGROUND OF THE INVENTION

The present invention relates to viewing screens, and more particularly, to a novel method for fabricating a viewing screen with enhanced contrast, and the screen so formed.

Rear projection viewing screens are utilized in rear projection television and the like systems, wherein the amount of light which can be projected upon the viewing screen is limited by the brightness of phosphors presently available. Contrast of the image thus formed will decrease with increasing levels of ambient light reflected to a viewer, from darker areas of the screen image. Thus, ambient light must be severely reduced to prevent the appearance of a "washed out" image on the screen.

Typically, to prevent ambient light reflection to the viewer, the material of which the projection screen is fabricated often includes a bulk darkening agent. The bulk darkening agent absorbs some of the ambient light, but also absorbs a portion (typically about 20%) of the light to be transmitted through the screen to the viewer. Thus, the viewer sees an apparently dark screen having an increase in contrast under ambient light conditions; this apparent increase in contrast is offset by the attenuation of brightness, i.e. the reduced magnitude of light transmitted through the screen.

It is also known to provide improved contrast by casting lenslets into one of the surfaces of a screen, whereby light is focused on the viewable screen surface, so that less than one-half of that surface actually transmits light. The remainder of the screen surface is blackened, presenting a very dark appearance to the viewer but providing improved contrast. However, the fabrication of a screen having cast lenslets, wherein the lenslets are curved in both dimensions of the screen plane, is both difficult and costly. It is therefore highly desirable to provide a projection screen in which an improved contrast ratio can be provided in more economical manner than hitherto known screens.

BRIEF SUMMARY OF THE INVENTION

In accordance with the invention, the viewable front surface of a rear projection screen, which front surface has an array of substantially parallel lenticules cast therein, is selectively darkened along lines spaced from one another over the extent of the viewable surface. The darkening lines can be positioned orthogonal to the lenticule-defining screen surface grooves, can be positioned within the grooves, or both. The spacing, thickness and density of the darkening lines are selected to achieve a desired amount of screen blackening and contrast enhancement.

Accordingly, it is an object of the present invention to provide a method for enhancing contrast of a viewing screen by selective darkening of the viewable surface thereof.

It is another object of the present invention to provide a viewing screen having enhanced contrast by selective darkening of the viewable surface.

These and other objects of the present invention will become apparent upon consideration of the following detailed description, when read in conjunction with the drawings.

BRIEF DESCRIPTION OF THE DRAWING

The sole FIGURE is a perspective view of a portion of a rear projection viewing screen utilizing the selective darkening method of the present invention for enhancing contrast thereof.

DETAILED DESCRIPTION OF THE INVENTION

Referring to the sole FIGURE, in which dimensions have been greatly exaggerated for the purpose of clarity, a viewing screen 10 is fabricated of a substantially transparent material. The rear surface 11 of screen 10 may be substantially flat, or may, for use in a rear projection television system and the like, be provided with optical elements, such as a Fresnel lens as formed into rear surface portion 11a. The screen front, or viewable, surface 12 is advantageously provided with an array of lenticules 14, defined by essentially parallel grooves 16 formed into the screen surface. The parallel lenticule columns, shown having a substantially parabolic surface and arranged to run vertically, have a lenticule groove spacing L of selected value, e.g. about 0.02 inches in one rear projection television screen embodiment with a screen front-to-back thickness on the order of one-eighth inch.

In accordance with the invention, viewing screen contrast is enhanced in the presence of ambient light, or increased ambient light is allowable for a given contrast, responsive to the selective darkening of front surface 12 by darkening lines 20. Lines 20 may be fabricated upon front surface 12 by utilizing any light-absorbing material compatible with a selected method of depositing that material in substantially straight lines and with a required definition. Darkening lines 20 can be deposited: only with the direction of elongation substantially orthogonal to the direction of the lenticule-forming groove 16; only with the direction of elongation substantially parallel to (e.g. within) the lenticule-forming grooves; or both parallel and perpendicular to the grooves (as shown by groove-parallel portions 20a and groove-perpendicular portions 20b in the lower right hand portion of the drawing). The spacing S between adjacent lines can be selected for the particular application, e.g. a spacing of about 0.04 inches is utilized in the illustrated rear projection TV screen example. The thickness T of each line can likewise be selected for a particular end use. Thus, the degree of screen darkening, i.e. the percentage of the screen covered by darkening lines 20 is established primarily by the thickness and spacing of the lines. It will be seen that, when lines both perpendicular and parallel to the lenticular-forming grooves are utilized, the darkening material forms aperture-defining deposits; the ratio of aperture area to screen area will decrease as the line thicknesses are increased. Thus, darkening lines 20 obviate the need for a bulk darkening agent within the screen itself, and provides greater contrast enhancement than bulk darkening for a given ambient light level and screen transmission percentage.

While the present invention has been described with respect to one presently preferred embodiment thereof, many modifications and variations will now become apparent to those skilled in the art. For example, the oval apertures may be square or rectangular (if low viscosity darkening material is used to define squared corners). It is my intent, therefore, to be limited only by the scope of the appending claims, and not by the specific details and instrumentalities presented by way of illustration herein.

What is claimed is:

1. A method for enhancing contrast of a projection screen having a viewable surface, comprising the steps of:
providing a one-piece solid projection screen formed of a substantially uniformly transparent material;
providing the viewable screen surface with a plurality of substantially parallel grooves defining a plurality of substantially parallel lenticule columns therebetween;
depositing a plurality of substantially parallel lines of light-absorbing darkening material only upon the screen viewable surface and in a direction substantially perpendicular to the direction of the lenticules; and
selecting the spacing and thickness of the lines to provide a desired degree of surface coverage.

2. The method of claim 1, wherein the spacing between adjacent darkening lines is selected to provide a desired screen resolution.

3. The method of claim 2, wherein the thickness of each line is selected to provide a desired attenuation of light transmitted through the screen.

4. The method of claim 1, further comprising the step of: depositing additional light-absorbing darkening material only on the viewable surface and in the grooves defining said lenticules to form a two-dimensional grid having darkening lines both substantially parallel and substantially perpendicular to the lenticule direction.

5. A projection screen having an enhanced contrast ratio, comprising:
a one-piece solid sheet of substantially uniformly transparent material, said sheet having a viewable surface and another surface from which light is transmitted through the sheet to said viewable surface;
a plurality of substantially parallel grooves fabricated into said viewable surface to define a multiplicity of substantially parallel lenticules; and
a multiplicity of substantially parallel and spaced lines of light-absorbing darkening material deposited only upon said viewable surface and in a direction substantially perpendicular to the lenticule-defining grooves.

6. The screen of claim 5 further including a second multiplicity of spaced and substantially parallel lines of light-absorbing darkening material deposited only upon said surface and substantially parallel to and within said grooves.

7. The screen of claim 5, wherein the lenticule-defining grooves are spaced a distance L apart, and wherein the darkening lines are spaced apart by a spacing distance greater than distance L.

8. The screen of claim 7, wherein the spacing distance is about 2L.

9. The screen of claim 7, wherein said first and second multiplicity of darkening lines are of sufficient thickness to define a two-dimensional array of apertures upon said viewable surface.

10. The screen of claim 9, wherein said apertures have a substantially oval shape in a plane parallel to said viewable surface.

* * * * *